Fig. 1.

INVENTOR.
WALTER W. WILSON
BY
Meyer, Tilberry & Body
ATTORNEYS.

Fig. 2

INVENTOR.
WALTER W. WILSON

ATTORNEYS.

Fig. 3.

INVENTOR.
WALTER W. WILSON
BY
Meyer, Tillery & Body
ATTORNEYS.

*Fig. 11.*

*Fig. 12.*

# United States Patent Office 3,718,216
Patented Feb. 27, 1973

3,718,216
FORMING PRESS SYSTEM AND WORKPIECE HANDLING AND TRANSFER APPARATUS THEREFOR
Walter W. Wilson, Levittown, Pa., assignor to E. W. Bliss Company, Canton, Ohio
Filed Apr. 1, 1969, Ser. No. 812,268
Int. Cl. B65g 29/00
U.S. Cl. 214—1 BC                4 Claims

ABSTRACT OF THE DISCLOSURE

A forming press system wherein the presses are positioned in groups about a central point and transfer of workpieces between presses is accomplished by a rotating handling apparatus.

---

The present invention is directed toward the press art and, more particularly, to an improved forming press system and a work and/or material handling apparatus therefor.

The invention is especially suited for use in automating the feeding and discharging of a plurality of metal working presses arranged to perform sequential operations on the same workpiece, and will be described with particular reference thereto; however, as will be appreciated, the invention is capable of broader application and could be used with many types of presses operating singly or in different combinations.

Automated material and work handling systems for presses and press lines have been in widespread use for many years. Generally, the typical press line includes a plurality of presses positioned in a line and arranged to sequentially perform a series of operations on the same workpiece, for example, blanking, drawing and trimming operations. Normally, the work removing or feeding devices comprised work gripping jaws carried from support arms mounted on or adjacent the presses. Means functioned to move the support arms into and out of the presses in timed relationship with the movement of the press slides to deposit or remove the workpieces. Typically, one such device was positioned on each side of each press and associated with a chain conveyor or similar mechanism which conveyed the workpieces between successive presses.

The above-discussed systems have been relatively satisfactory; however, they do have a number of distinct disadvantages. The most apparent disadvantage is that each interpress transfer required three separate mechanisms i.e., an extractor, a conveyor, and a feeder. Further, the many separate mechanisms complicated the controls required to synchronize or automate the line. Additionally, if it was necessary to invert the workpiece between successive presses, still another mechanism was required.

The noted complexity of the prior systems produced many operational problems. First, maintenance was a significant problem because of the many diverse mechanisms and their complicated interrelationship. Secondly, for example, if it was necessary to convert the line over to the manufacture of a different product, each of the individual machines had to be modified by changing the work grippers, the work holders on the conveyors, varying the length of stroke of the arms, etc. Thirdly, it was generally not possible to by-pass one of the presses in the line and the versatility of the system was limited.

The present invention provides an apparatus and press arrangement whereby workpieces can be conveyed successively through a plurality of presses with one basic device or material handling unit. With the subject invention change-over from one product to another is simplified and it is possible to selectively by-pass any desired press. Further, substantial savings can be achieved in the space required for the system, as well as, in the first cost of the handling and transfer equipment. Likewise, because of the simplicity of the invention maintenance costs and problems are reduced.

In accordance with one aspect of the invention a power press system is provided which includes a plurality of presses positioned about a central point. Mounted generally at the central point is a workpiece transferring mechanism for moving workpieces sequentially through the presses. The mechanism has a plurality of radially extending arms carrying workpiece gripping members. Power means function to rotate the arms about the central point and move the work gripping members into and out of the working areas of the presses in timed relationship with the movement of the press slides to remove and/or deposit workpieces therein.

In accordance with more specific aspects of the invention, the transferring mechanism includes means for inverting workpieces carried by the gripping members, as well as, varying the elevation of the workpieces.

As can be appreciated, devices constructed in accordance with the invention permit inter-press workpiece transfer to be accomplished without the necessity of transferring the workpiece between different handling devices during movement of the part between successive presses. Additionally, workpiece transfer between all the presses can be accomplished with one machine and the floor area required for the entire system is substantially reduced. A further advantage of the subject system is that any of the presses in the system can be by-passed without the necessity of conveying the workpiece through the press or providing special auxiliary handling equipment.

A primary object of the present invention is the provision of a press system wherein workpiece handling and conveying is accomplished in an extremely simple and versatile matter.

A further object is the provision of apparatus of the type described wherein a single apparatus can perform all inter-press transfer and handling functions for several presses.

A still further object of the invention is the provision of apparatus wherein workpieces can be transferred out of a first press, inverted, and placed in a second press while maintaining complete control over the workpiece.

Yet another object is the provision of a system of the type described wherein the presses are positioned about a central point and inter-press transfer is accomplished by a single apparatus positioned substantially at the central point.

Yet another object is the provision of apparatus of the type described which is simple to maintain and reliable in operation.

These and other objects and advantages will become apparent from the following description when read in conjunction with the accompanying drawings wherein:

Figure 1:
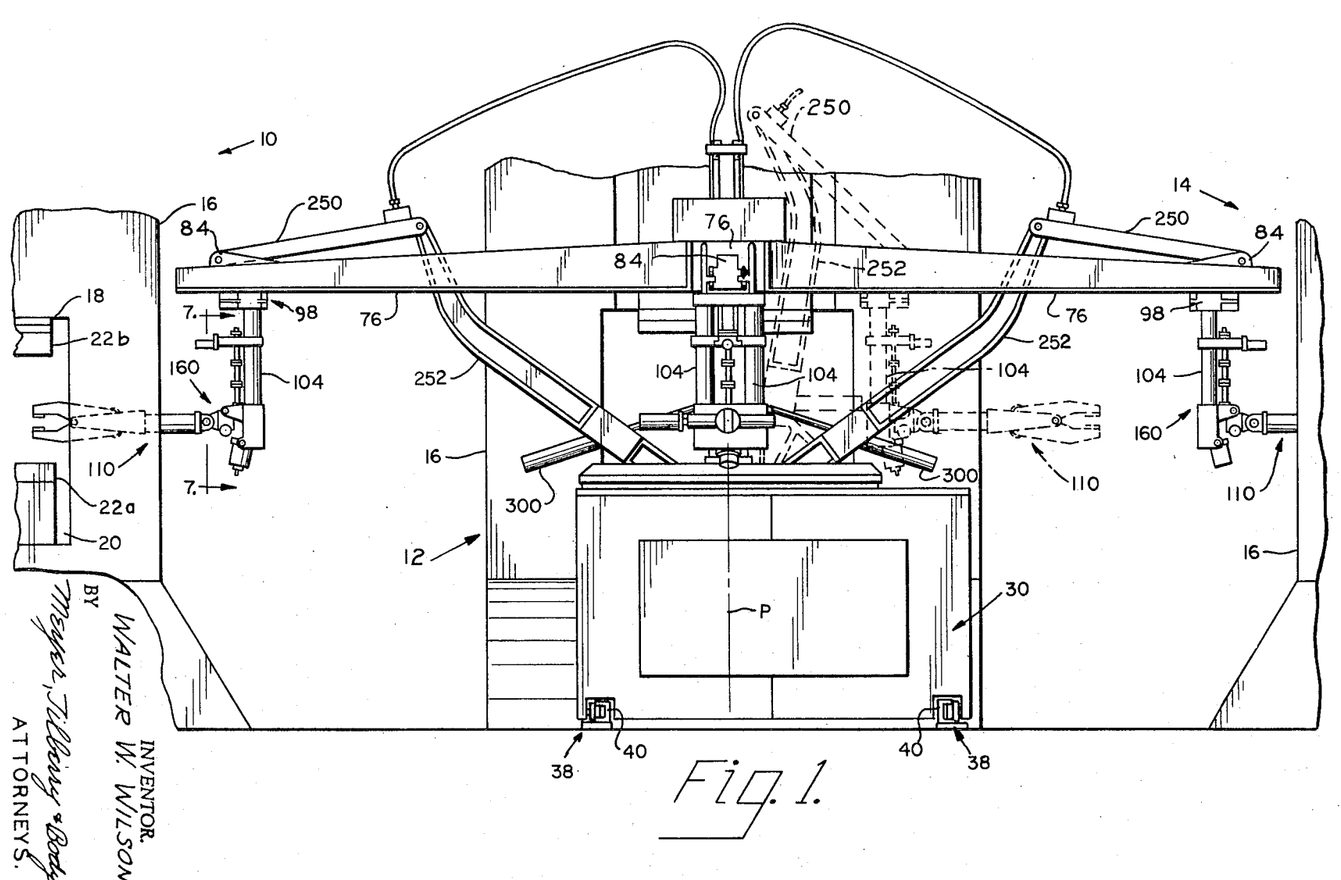
FIG. 1 is a side elevation showing a press system arranged in accordance with one aspect of the invention and provided with a work handling and transfer apparatus formed in accordance with a preferred embodiment of a second aspect of the invention.
Figure 2:
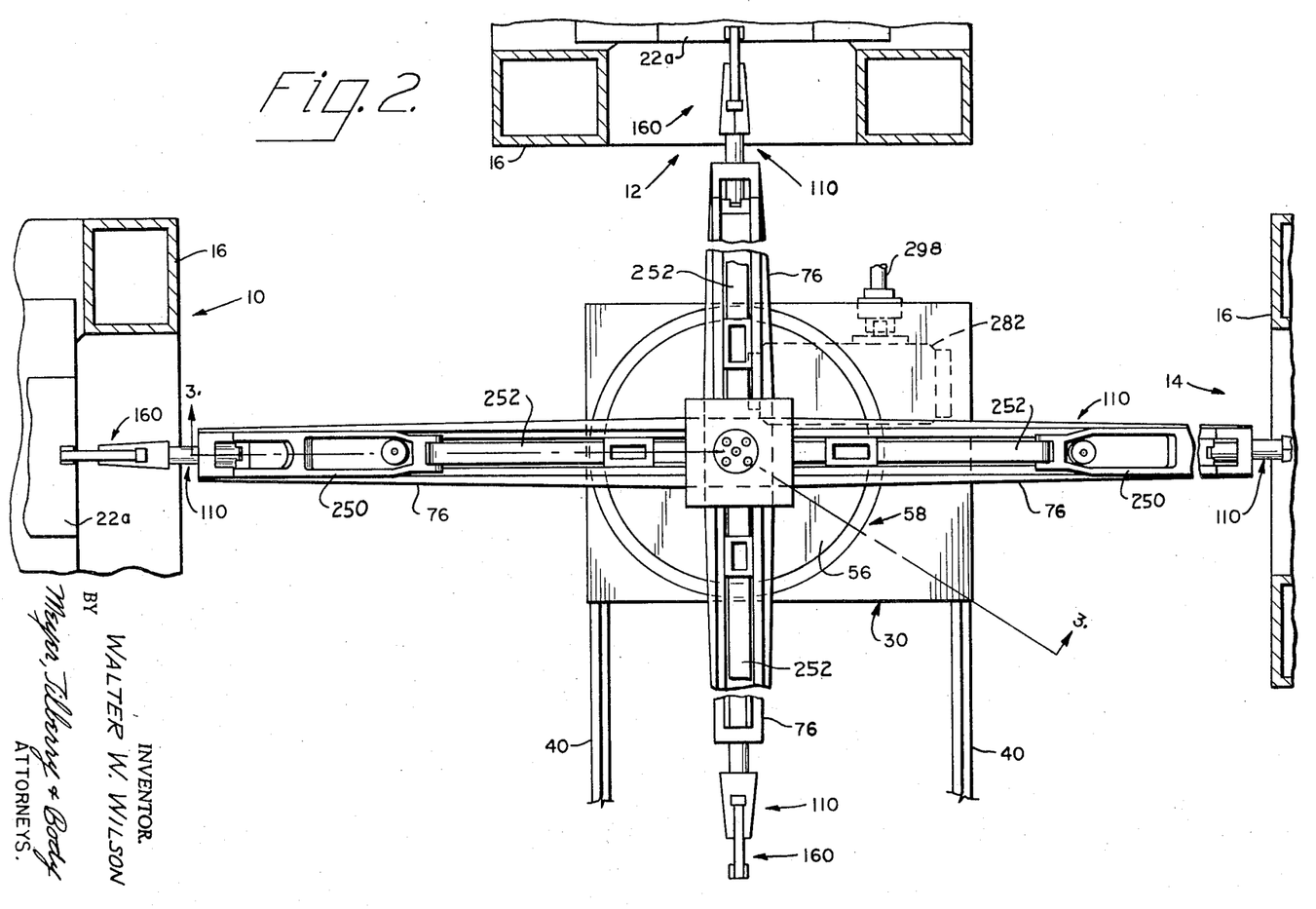
FIG. 2 is a plan view of FIG. 1.

Referring more specifically to the drawings wherein the showings are for the purpose of illustrating preferred embodiments of the invention only and not for the purpose of limiting the same, FIGS. 1 and 2 show the overall arrangement of a press system and work handling and transfer mechanism formed in accordance with the preferred embodiment of the invention. As shown, the system includes conventional metal working presses 10, 12 and 14 each having a vertically extending frame 16. The presses include the usual slide 18 which is reciprocated vertically toward and away from a subjacent bed 20. The typical forming dies 22a and 22b are carried by the slide and bed respectively. As used hereafter, the volume or area between the dies when they are in their spaced position will be referred to as the "work area."

The particular details of construction of the presses is not important to the invention. Likewise the actual type of work being done in each of the presses is not significant and it could, for example, be a sequential series of blanking, stamping, and drawing or other forming operations required to form a desired product. Of particular importance to one aspect of the invention however, is the arrangement of layout or the presses. As shown in FIGS. 1 and 2, the presses 10, 12 and 14 are positioned about a vertical center line P such that the work areas of the presses are each spaced radially and circumferentially of the central area. Preferably, the radial spacings from center line P are nearly equal, as are the arcuate or circumferential spacings. Likewise, in the preferred embodiment the work areas are at approximately the same elevation and are accesible along radial paths extending from the axis P.

With the presses laid out in the described arrangement, workpiece handling and transfer is greatly simplified and can be accomplished by a single mechanism. Merely by positioning a rotary work handling mechanism generally at the center line P and providing it with a number of work gripping members at least equal to the number of presses, all work transfer functions can be accomplished from the central point P.

A full understanding of the advantages flowing from the particular press layout described, can best be understood from a detailed description of the preferred form of handling apparatus. The handling apparatus shown comprises a main base frame or housing assembly 30 formed in any convenient manner. In the embodiment under consideration, the base frame 30 includes a central frame 32 formed from structural frame members such as channels enclosed by a sheet metal housing 34. The frame has a heavy top plate 36 carried on the upper ends of the frame channels and supported thereby. Preferably, the base frame 30 is provided with wheel assemblies 38 arranged to permit the apparatus to be moved from its operative position at the central point defined by centerline P, to a position outwardly of the press cluster for maintenance and/or repair. As shown, the wheel assemblies 38 are adapted to ride on channel-shaped track members 40 affixed to the press room floor. A clamping or locking mechanism (not shown) is provided to lock the frame in a stationary position on the tracks during operation.

Figures 9, 10:
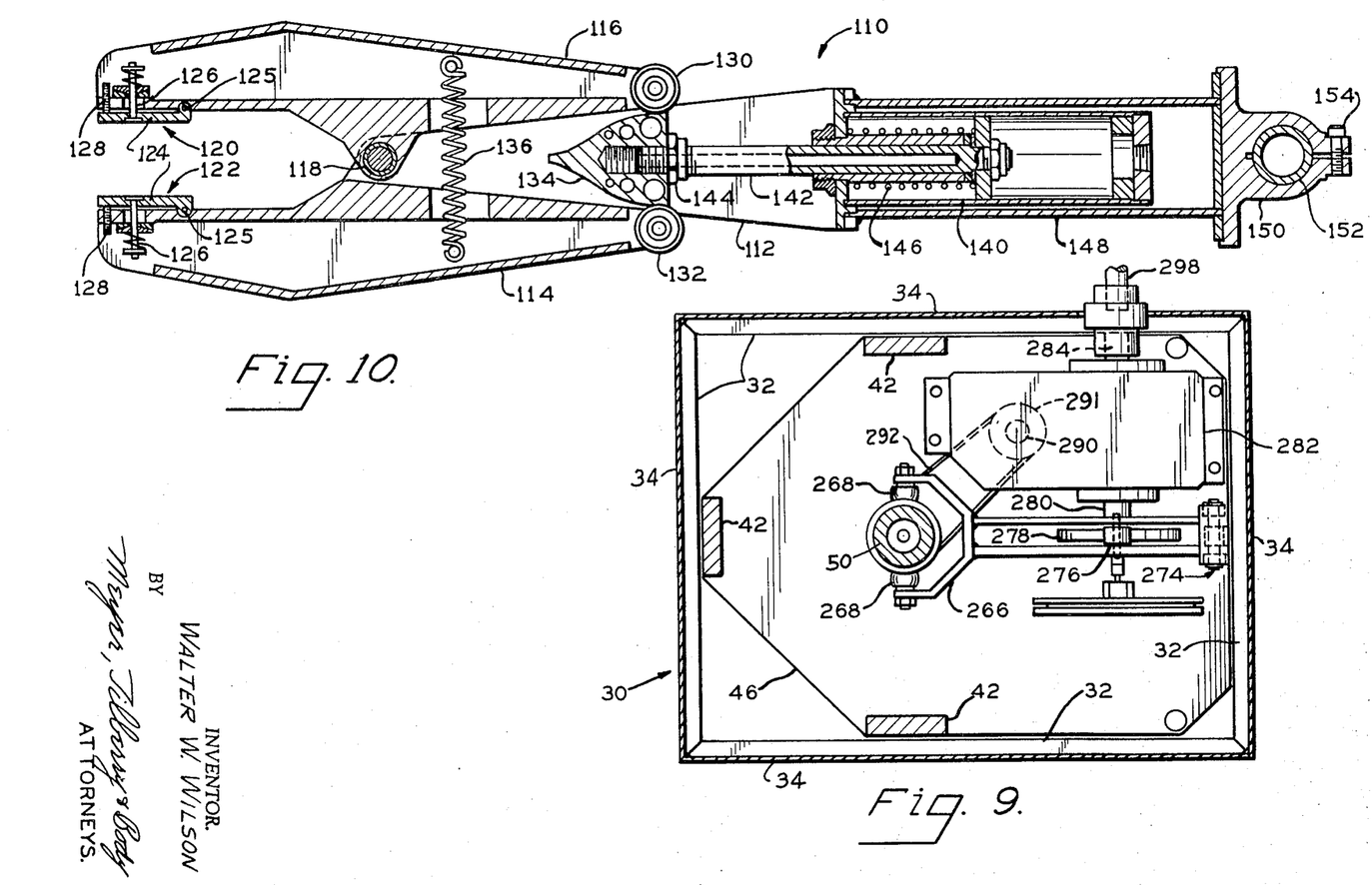
FIG. 9 is a cross-sectional view taken on line 9—9 of FIG. 3 and showing the drive arrangement used to provide indexed rotary motion and reciprocation of the work gripping members.
FIG. 10 is a cross-sectional view through the preferred form of work gripping member and actuating mechanisms; and, FIGS. 11–12 are diagrammatic plan views showing various press system arrangement formed in accordance with the invention.

Extending downwardly from the top plate 36 are 3 support plates 42 (see FIG. 9). These support plates 42 are connected to the top plate 36 in any convenient manner, such as through the use of machine screws 44. Supported from the lower ends of the members 42 is a horizontally extending plate member 46. Plate 46 is likewise connected to the members 42 through the use of machine screws 48.

Figure 3:
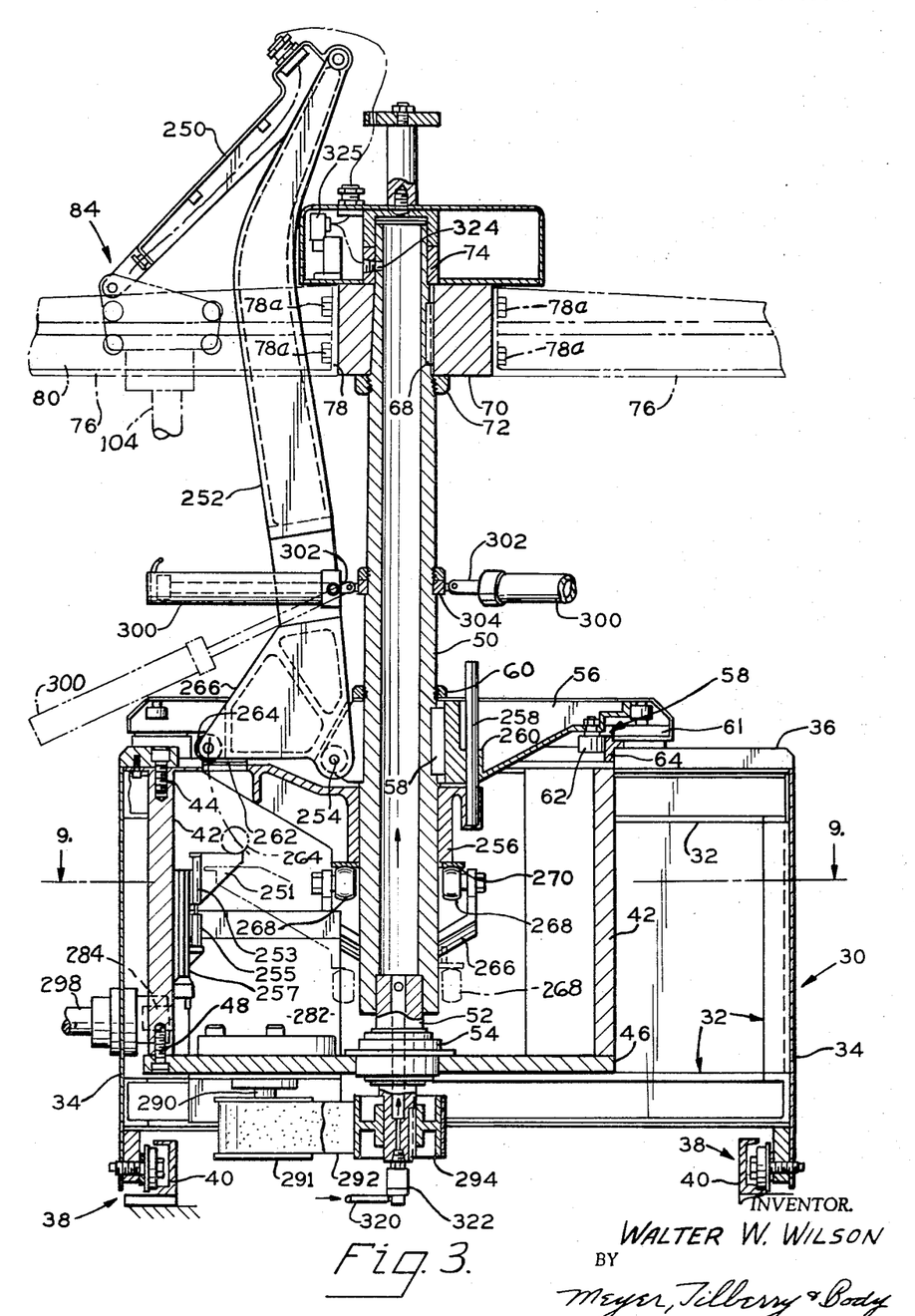
FIG. 3 is a cross-sectional view taken on line 3—3 of FIG. 2 and showing in detail the various operating mechanisms of the work handling and transfer apparatus.

Extending vertically upwardly from the plate 46 is a main support spindle 50. The spindle 50 is freely rotatable relative to the plate 46. As best shown in FIG. 3, spindle 50 is carried on the upper end of a stub shaft 52 which is, in turn, carried by a conventional thrust bearing 54 supported in the plate 46.

A circular support flange or plate member 56 extends radially outwardly of spindle 50 and is connected thereto by a key 58 and a nut 60. The outer periphery of the support plate 56 is guided by a roller track assembly 58 affixed to support plate 56. As shown, the roller track assembly 58 comprises a circumferential series of rollers 62 which extend downwardly from the underside of support plate 56 and engage a circumferential flange 64 formed about the support plate 36. This arrangement permits the central spindle 50 to be freely rotatable relative to the base frame and housing assembly 30, while providing it with substantial lateral rigidty.

Mounted at the upper end of the spindle 50 and keyed thereto by a key 68 is a main support hub 70. The hub 70 is mounted between a large nut 72 threaded to spindle 50 and a sleeve 74 removably connected to the upper end of the spindle 50. Four radially extending arms 76 are connected to the hub in any convenient manner, such as by the use of machine screws 78. The arms 76 are preferably arranged so that in a first position of rotation of spindle 50, three of them extend toward the work areas of the respective presses. In the particular layout shown in FIGS. 1 and 2, the arms are mounted from the hub 70 so as to extend radially at 90° spacings.

The particular manner in which the arms are constructed is not of importance. They are each shown however, as a casting structure including an end plate 78 and two radially extending plates 80 (see FIG. 4). Flanges 82 extend long the lower edge of each plate 80 throughout the length of the arm 76.

Each of the arms 76 has a respective carriage assembly 82 carried therein and mounted for reciprocation longitudinally of the arm. Each of the carriages 84 comprises a cast or weldment body 86 having four sets of rollers carried in bosses extending laterally outwardly thereof. The lower rollers 90 of each set are carried on stud bolts 92 threadedly received in the lower ones of bosses 88. It will be noted that the rollers 90 have flat outer peripheries which engage the under side of flanges 94 extending inwardly from the side members 80 of the arm 76. The upper rollers 96 are similarly connected to eccentric bushings 97. Eccentric bushings 97 are connected to upper bosses 88 by wedge screws 99. These rollers have a V-shaped periphery arranged to be received in a corresponding grove formed in the top side of the noted flanges 94. This arrangement provides a rigid guideway for the carriage. The eccentric bushings 97 allow for vertical preloading between rollers.

Figure 4:
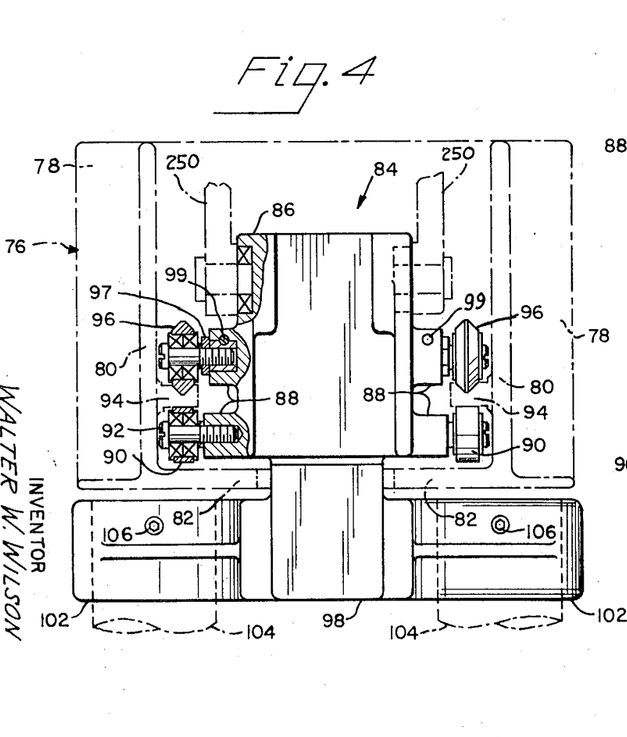
FIGS. 4–6 are detailed showings of carriage arrangement used to provide reciprocatory movement of the work gripping mechanisms.
Figure 5:
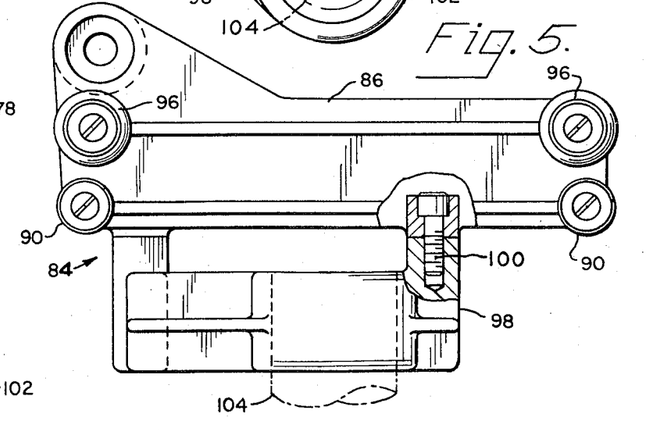
Figure 6:
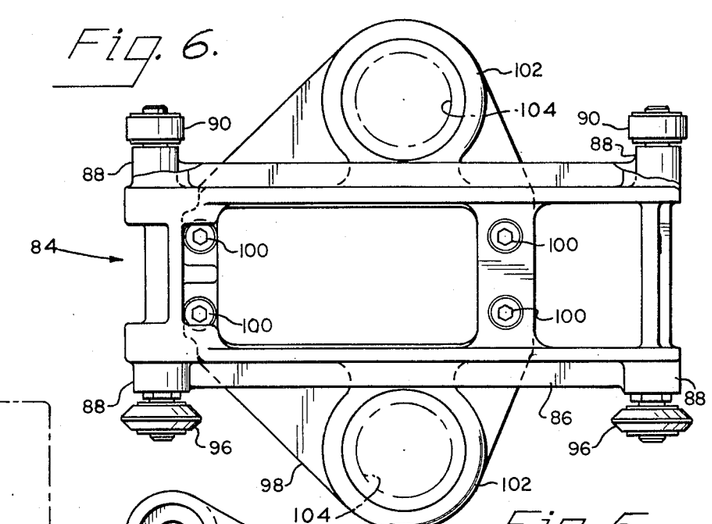

Extending downwardly from the underside of each carriage assembly 82 and supported thereby is a bracket member 98. Each bracket member 98 has, as best shown in FIG. 5, opposite ends removably connected to the carriage frame 86 by socket screws 100. The brackets 98 further include a pair of sleeved portions 102 which, as best shown in FIGS. 4 and 6, extend laterally outwardly of the carriage at a position beneath the lower flange 82 of the respective arm 76.

Extending downwardly from each of the sleeves 102 are tubular support members 104. As shown in FIG. 4, the supports 104 are clamped in their respective sleeves 102 by socket screws 106. Referring to FIG. 1, it is seen that a work gripping assembly 110 is carried at the lower end of each of the support members 104.

Depending upon the type of workpieces being handled and the particular die construction used in the presses, the work grippers could be of many types. In the subject embodiment however, the grippers are shown as air actuated clamps. Referring to FIG. 10, the details of one of the clamps or workpiece gripping members is shown in detail and will now be described. As shown, the workpiece gripping assembly 110 is comprised of two opposed brackets 112 which has a pair of clamp arms 114 and 116 pivotally connected to its outer end by a pin 118. The clamp arms 116 and 114 each have adjustable clamping surfaces 120 and 122 mounted at their outer ends. The adjustable clamp surfaces 120 and 122 are identical in construction and are pivotally connected to the arms for movement about point 125 and biased toward its respective arm by a spring loaded pin 126. The inclination of the clamp members 120 and 122 relative to their respective arm is adjustable by a threaded screw 128. The clamp members 116 and 114 each terminate in a respective roller member 130, 132. These roller members function as cam followers and are biased into engagement with a contoured cam 134 by a tension spring 136.

The opening and closing of the clamp members 114 and 116 is, of course, controlled by reciprocation of the contoured cam 134 between the roller members 130, 132. By varying the shape of the cam 134, the movement and spacing of the jaws can be varied.

The means for reciprocating the cam member 134 could be of many types, but is shown as an air cylinder 140. The piston rod 142 extending from the cylinder 140 is releasably connected to the cam member 134 by a threaded end portion and locking nut 144. A spring 146 functions to bias the piston to the right (as shown in FIG. 10) to normally maintain the jaws in an open position except when air is supplied to the cylinder 140.

The clamp assembly 110 further includes a support tube 148 which is welded or otherwise positively connected to the right-hand end of the support tube 148 is similarly connected to a split bracket 150 arranged to be adjustably clamped to a cylindrical support shaft or tube 152 by a socket screw 154.

Although in many press installations the workpiece gripping assembly 110 could be rigidly mounted from the arms 76, it is highly desirable and often necessary that the workpiece grippers be capable of a multiplicity of powered movements. For this reason, each of the workpiece gripping assemblies 110 is connected to its respective carriage 82 and arm 76 through a power adjusting assembly 160. The assembly includes means for revolving the work gripping assembly about its longitudinal axis to permit workpieces to be inverted during their transfer between presses. The assembly further includes means for varying the horizontal inclination of the work gripper, as well as, selectively changing its horizontal elevation.

Figure 7:
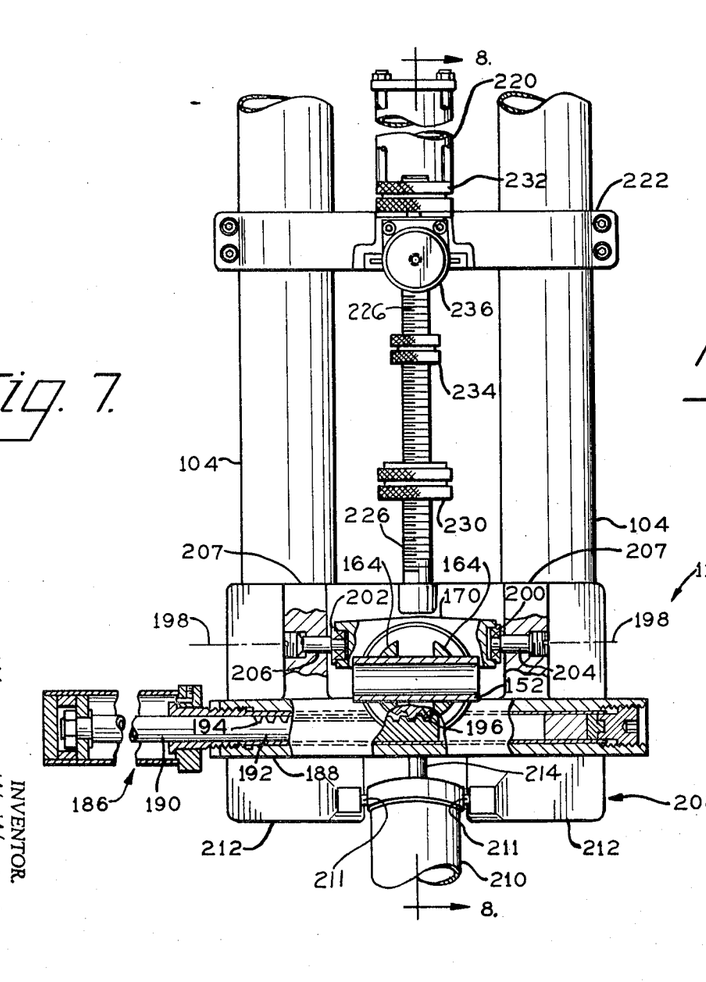
FIG. 7 is an enlarged view taken on line 7—7 of FIG. 1 and showing the mechanism used to provide multiple movements of the work gripping members.
Figure 8:
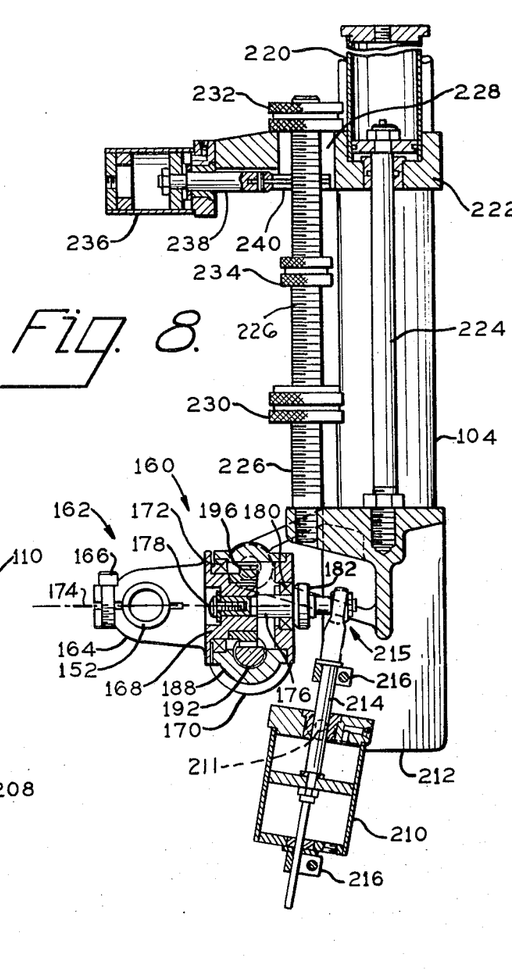
FIG. 8 is a cross-sectional view taken on line 8—8 of FIG. 7.

Referring in particular to FIGS. 7 and 8, it will be noted that the tubular support 152 (which, as shown in FIG. 10, is clamped to the split bracket 150 of workpiece gripping assembly 110) has its outer ends adjustably received in a split clamp unit 162. The unit 162 has two clamping portions 164, one positioned on each side of the split clamp 150. The portions 164 are each clamped to the support tube 152 by socket screws 166.

The clamp bracket 162 has a stepped diameter inner end 168 which is received in a bracket 170. The stepped inner end 168 is rotatably mounted in the bracket 170 by bearings 172. It is retained therein while being free to rotate about a generally horizontal axis 174 by a stud 176 which is connected to the bracket through a screw and washer arrangement 178. The stud 176 extends through a bearing 180 carried in the back of the bracket 170. A clamp nut 182 functions to clamp the bracket 164 and stud 176 in the bracket 170.

While the means for rotating the bracket 164 about the axis 174 could be of a variety of types, it preferably comprises a double acting air cylinder 186 connected to the left-hand end (as viewed in FIG. 7) of a tubular sleeve 188. The tube 188 is welded or otherwise connected to the bracket 170. The piston rod 190 of the cylinder 186 extends outwardly through the tube 188 and is freely slidable therethrough in a sleeve bearing 192. The outer end portion of the piston rod 190 is provided with rack gear teeth 194. These gear teeth engaged a gear 196 which is keyed to the diametrical end portion 168 of bracket 164. Accordingly, by controlling the supply of air to the cylinder 186 the bracket 164 can be rotated about axis 174 thereby rotating the work gripping assembly 110. Thus, workpieces may be inverted and re-oriented as they are being transferred between presses thereby eliminating an intermediate handling step when compared with the prior art work handling and transfer systems.

As previously mentioned, the powered adjusting assembly 160 also includes means for varying the horizontal inclination of the axis of the work gripping assembly 110. In order that this can be accomplished the bracket 170 is mounted for pivotal movement about a horizontal axis 198 which extends perpendicular to the longitudinal axis of the work gripping assembly 110. Referring to FIG. 8, it is seen that the outer lateral ends of the bracket 170 are provided with a small recess into which are received bearings 200 and 202. Screws 204, 206 extend inwardly and engage the bearings 200 and 202 respectively. The screws 204 are carried in leg portions 207 which extend outwardly from the main bracket 208.

The means for shifting the bracket 170 about the axis 198 include a double acting air cylinder 210 which is pivotally mounted by pins 211 extending inwardly from the downwardly extending legs 212 of bracket 208. The piston rod 214 of cylinder 210 is connected through a ball and socket type joint 215 with the outer end of the shaft 176. A pivotal stop member 216 is provided to limit the movement of the piston rod. By properly controlling the air flow to the cylinder 210 the inclination of the work gripping assembly 110 can be varied at any time during a feed cycle. This makes it possible to lift and deposit workpieces on the dies with great precision.

The power movement assembly 160 also includes means for varying the horizontal elevation of the work gripping assembly 110. These means are arranged to operate simultaneously with the inverting and inclination changing means or independently thereof. As shown in FIGS. 7 and 8, the bracket 208 is received on the lower ends of the support shafts 104. The bracket 208 includes openings extending vertically therethrough which receive the support tubes 104. The bracket is freely slidable on the support tubes for adjustable movement therealong. An air cylinder 220 is carried on bracket 222 clamped midway up the support tubes 104. The cylinder 220 has the lower end of its piston rod 224 threadedly connected to the top surface of the sliding bracket 208. By controlling the supply of air to the cylinder 220 the work gripping assembly can be selectively raised and lowered at any time during the transfer cycle.

In order to control the elevating movement means are provided for adjustably limiting the extent of vertical movement of the slide member 208. These means include a rod 226 which extends upwardly from the bracket 208 and through an enlarged opening 228 formed in the bracket 222. The rod 226 is threaded throughout its length and has a pair of relatively large diameter adjustable stop nuts 230 and 232 carried thereon. By adjusting the position of the stop nuts 230 and 232, the upper and lower limits of movement can be varied. Additionally, an intermediate, smaller diameter, stop nut 234 is arranged to provide an intermediate height adjustment. The nut 234 can pass freely through the opening 228; however, an air cylinder 236 is carried at the left-hand end of the bracket 222 and has its piston rod 238 extending inwardly toward the threaded shaft 226. Carried at the inner end of the piston rods 238 is a U-shaped stop member 240. This stop member, when actuated to the position shown solid in FIG. 8, will prevent movement of the smaller diameter stop nut 238 through the opening 228. In the press system described, this permits the parts being transferred to be elevated a first distance at one press and a second distance at a subsequent press.

Referring again to FIGS. 1 and 2, it will be noted that the work handling assemblies 110 are movable between an extended position shown solid and a retracted position shown dotted. This particular movement of the work grippers could be accomplished in many ways, such as, for example, by the use of air or hydraulic cylinders controlled in accordance with the movement of the press slides. It is preferable however, to utilize a direct mechanical drive for producing the inward or retraction movement, and a drive capable of providing a preset outward or extension drive force. As shown, each of the carriages 82 is pivotally connected to one of a respective link member 250. The opposite end of each link member 250 is, in turn, pivotally connected to the uppermost end of a yoke line 252. The lower ends of each yoke link 252 are connected to the support plate 56 by a pivot pin 254. Positioned beneath the support plate 56 and slidably mounted on the spindle 50 is a lift plate 256. A plurality of pins 258 extend upwardly from the lift plate 256 and are slidably received in openings 260 formed in the main support plate 56. This arrangement constrains the lift plate 256 to rotate with the support plate 56 while being free to reciprocate longitudinally of the spindle 50.

At the outer periphery of the lift plate 256 there is an annular surface 262. The surface 262 is engaged by a roller 264 carried on a laterally extending portion 266 of the arm 252. Consequently, when the lift plate 256 is moved vertically to the solid line position shown in FIG. 3, the arms 252 are caused to move inwardly to retract the carriages and gripping assemblies.

Any of a variety of means could be used for reciprocating the lift plate at the proper time during the work transfer cycle. In the subject embodiment, the lifting is accomplished by a yoke arm 266 which, as best shown in FIGS. 3 and 9, has a pair of rollers 268 carried at its outer ends and engaging the under surface 270 of the lift plate 256. The opposite end of the yoke arm 266 is pivotally connected to the base frame 32 by a pivot pin 274. A roller or cam follower member 276 is mounted between the rollers 268 and the pivot pin 274. This follower rest upon a circular cam 278 which is driven by shaft 280 which extends outwardly from a cam box 282. As can be appreciated, by properly contouring the cam 278 and controlling the rotation of shaft 280, the lift plate 256 can be made to undergo any desired rise and fall to thereby retract the work grippers at any time during the transfer cycle. This, it will be noted, produces a positive mechanical retraction of the assembly.

As noted above, it is desirable that extension of the arms 252 and the work gripping assemblies be under a preset or biasing force. This provides a safe stop should an obstruction be encountered. For this reason, the subject device is provided with four air cylinders 300 (see FIGS. 1 and 3) which are each arranged to drive a separate one of the arms 252 outwardly with a predetermined force. Referring in particular to FIG. 3, it will be noted that the cylinders 300 have their piston rods 302 pinned to a collar 304 carried on spindle 50. The cylinders are each separately connected by a pin or pivot to their respective arms 252. Accordingly, by control of the air pressure supplied to the outer ends of the cylinders the force acting to extend the workpiece gripping assemblies is controlled.

The extension of arms 252 at each station is adjustable by positioning bumper blocks 251 affixed to slide block 253 bucked by upwardly spring loaded shock absorber 255 secured to vertically adjustable slide block 257. Surface 262 is of forked configuration allowing bumper block 253 to pass between the fork tangs and contact roller 264 limiting the outward displacement of arm 252 and its respective work gripping assembly 110.

In the subject embodiment, the cam box 282 is a conventional indexing drive unit having an input shaft 284 and the previously mentioned output shaft 280. Additionally, the cam box unit has a second output shaft 290 (see FIG. 3) which is connected to the input shaft 284 through a transmission arranged to produce indexed output motion of the shaft 290. The transmission is of the type generally designated four stop, 180°. This means that for every complete revolution for the input shaft 284, the output shaft 290 revolves only 90° and, further, that this 90° movement is accomplished during 180° of the total 360 degrees rotation of the input shaft 284. For the remaining 180° rotation of input shaft 284, output shaft 290 is stationary. The output shaft 290 is connected through sprocket 291 and a positive drive belt 292 with a sprocket 294 keyed to the lower end of the stub shaft 52. Accordingly, the main spindle 50 and the associated arms 76 are rotated in 90° indexed steps with each rotation of the input shaft 284. The input shaft 284 could be driven by an independent motor controlled in response to actuation of the presses; however, preferable to have a mechanical drive shaft such as shown at 298 in FIG. 9, which is directly mechanically connected to drive one of the presses in the system. This assures that the feed mechanism will be driven in exactly timed relationship with the associated presses. Further, in the subject device, the output shaft 280 is directly connected to the input shaft 284 for simultaneous rotation therewith.

As can be appreciated, in a system of the type described the presses must all be driven substantially simultaneously and the workpiece transferring or handling mechanism must be driven in proper timed relationship with the presses. The particular type of control used to accomplish this is not of importance to the invention. For example, the presses can be arranged for synchronous movement through the use of control systems such as the type shown in U.S. Pat. No. 3,199,439. Alternately, the presses can be single-stroked and interconnected through conventional electrical interlock arrangements.

The workpiece transfer mechanism can similarly be driven in synchronism with the press line or, alternately, provided with conventional interlock controls connected with the presses. In the subject embodiment, the rotation of the arms and retraction of the carriages is, of course, mechanically tied to the presses. With regard to the proper actuation and control of the various air cylinders used to provide movement of the carriages in an outward direction, as well as, the necessary powered movements of the workpiece gripping assembly, many types of controls could be used. Referring to FIG. 3 of the drawings, it will be noted that air is supplied through a line 320 and a rotary joint 322 centrally of the spindle 50. From the upper end of the spindle various outlet openings 324 are provided. Each of these are individually connected to suitable solenoid valves 325 with a respective one of the air cylinders. Control of the solenoid valves is accomplished by the use of cam actuated microswitches not shown. That is, a plurality of rotary cams are directly driven with the press drive shaft and used to actuate the switches controlling the supply of air to the various cylinders. Electrical signals from the switches would be transmitted from slip rings 61 thru brushes 60 connected to their respective solenoid valves. This particular arrangement forms no part of the subject invention and is discussed as merely one way in which control can be accomplished.

The operation of one complete cycle of the FIGS. 1 and 2 embodiment will now be described. Assume that the elements are all in the position shown. That is, all of the presses have just completed a working stroke and the slides are returning to their upper positions. Simultaneously with the upward movement of the slides 18, the carriages 82 are actuated outwardly along the arms (which are, at this time stationary) to move the work gripping assemblies into the press with which they are aligned. The work gripping assemblies moving into the first two presses (the presses at the 9 and 12 o'clock positions in FIG. 2) are actuated to grip the workpiece which have been formed therein during the previous working stroke. The gripping assembly on the arm pointing in the 6 o'clock direction grips an unformed blank supplied, for example, by a conventional de-stacker and feeder. The gripping assembly at the 3 o'clock position position moves into the third press but does not engage the finished workpiece. Rather, the workpiece is extracted out the rear of this press by a conventional extractor mechanism.

After the parts have been gripped, the carriages are retracted to remove the parts from the presses. Thereafter, the arms are indexed 90° clockwise to bring them into alignment with the next press in the group. It should be understood that, if required, the gripping assemblies can be actuated to invert the workpieces at anytime during the transfer operation.

With the arms aligned with the next press in the group the carriages are actuated outwardly to move the workpieces into the respective press. The gripping assemblies are then actuated to release the parts and deposit them in the presses. Thereafter, the carriages are retracted and the presses actuated to move downwardly through a working stroke.

The above-described sequence of operations is continuously repeated with the workpieces moving sequentially through all three presses. Obviously, many variations of the described sequence of operation are possible. For example, if the presses are of the C-frame or gap-frame type, retraction of the carriages would not be necessary since the arms could be indexed beyond each press to an intermediate position between adjacent presses following each workpiece deposit. Further, the actual gripping assembly movements e.g., part inversion, elevation change, etc. would vary depending upon the particular parts being formed.

Figure 11:
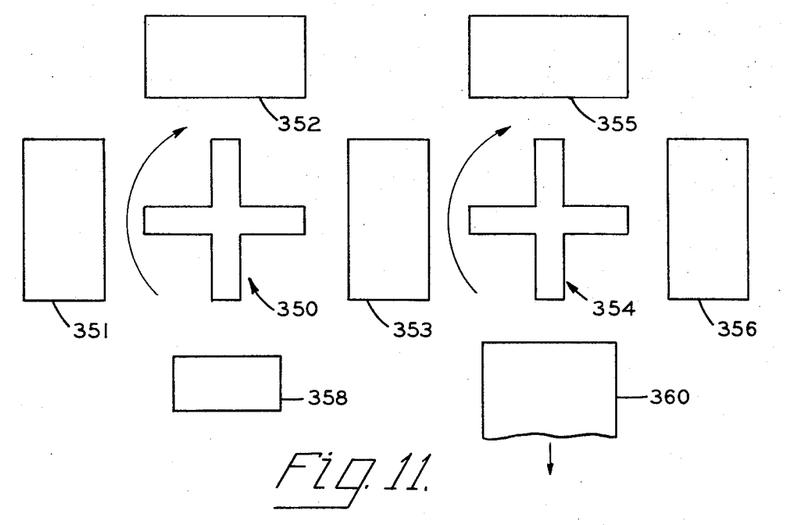

A second rotary work transfer mechnism 354 is positioned centrally of a press cluster comprised of the previously mentioned press 353 and two additional presses 355 and 356. Both transfer mechanisms 350 and 354 can be identical to the mechanism shown in FIGS. 1–10. The flow of workpieces is clockwise from press 351 to press 353, and clockwise from press 353 to 356. The feed of blanks to press 351 can be acomplished by a conventional de-stacker and feeder 358 positioned at the six o'clock location relative to the mechanism 350. The unloading of the finished parts from press 356 can likewise be accomplished with a conventional discharge apparatus positioned on the back side of the press. However, as shown the rotary work handling apparatus 354 can be used for extracting the finished workpieces and delivering them to a discharge conveyor or similar mechanism 360 located at the six o'clock rotation relative to the mechanism 354.

Figure 12:
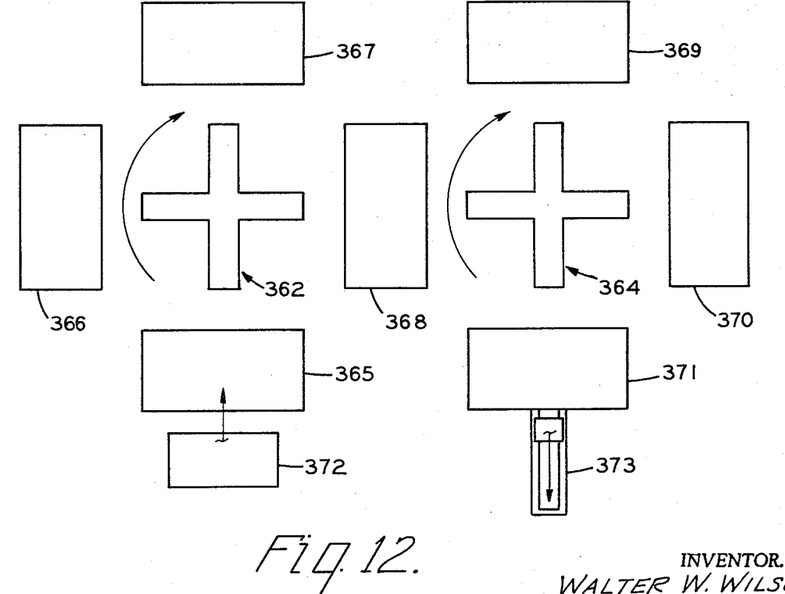

FIG. 12 shows an installation wherein a seven press line can be serviced by two of the rotary feed and transfer mechanisms. Note that two mechanisms 362 and 364 are positioned centrally of two clusters of presses located at 90° spacings. The mechanism 362 is arranged to move workpieces clockwise from the press 365 sequentially through to the press 368. The mechanism 364 then removes the workpiece from the back of press 368 and transfers it sequentially through presses 369, 370 to the final press 371. The feed of blanks to press 365 is accomplished, for example, by a conventional de-stacker and feeder 372. Likewise, discharge of the finished workpieces from press 371 is accomplished by a conventional reciprocating part remover 373. Thus, it can be seen, that with the particular invention described, a large number of presses can be serviced by a minimum number of transfer and feed mechanisms. Additionally, it is apparent that the described transfer and feed mechanism could be used in a conventionally arranged line of presses merely by positioning one of the mechanisms between each of the presses in the line. The versatility of the subject device thus offers great advantages in synchronizing or automating the transfer of workpieces through a series of forming presses.

The invention has been described in great detail sufficient to enable one of ordinary skill in the press art to make and use the same. Obviously, modifications and alterations of the preferred embodiment will occur to others upon reading and understanding of the specification and it is my intention to include all such modifications and alterations as part of my invention insofar as they come within the scope of the appended claims.

Having thus described my invention, I claim:

1. Apparatus for transferring workpieces between a plurality of forming presses comprising; a frame, a substantially vertical standard rotatably mounted on said frame, a plurality of circumferentially spaced elongated arms carried by said standard and extendnig substantially radially therefrom, a carriage slideably carried by each of said arms for reciprocating movement thereon between extended and retracted positions, an actuator arm pivotally connected with each of said carriages and said standard for moving said carriages between said extended and retracted positions, each of said actuator arms being pivotally connected with said standard for downward swinging movement to move said carriages to said extended positions and for upward swinging movement to move said carriages to said retracted positions, power means for rotating said standard in predetermined increments, work gripping means carried by each of said carriages, actuating means for swinging said actuator arms to move said carriages between said extended and retracted positions, said actuating means includnig biasing means for normally biasing said actuator arms downward to move said carriages to said extended positions, and sleeve means movably positioned on said standard for upward movement relative thereto to move said actuator arms downward for moving said carriages to said retracted positions.

2. The device of claim 1 and further including cooperating cam and cam follower means for shifting said sleeve means vertically relative to said support.

3. Apparatus for transferring workpieces between a plurality of forming presses comprising; a frame, a substantially vertical standard rotatably mounted on said frame, a plurality of circumferentially spaced elongated arms carried by said standard and extending substantially radially therefrom, a carriage slideably carried by each of said arms for recipocating movement thereon between extended and retracted positions, an actuator arm pivotally connected with each of said carriages and said standard for moving said carriages between said extended and retracted positions, each of said actuator arms being pivotally connected with said standard for downward swinging movement to move said carriages to said extended positions and for upward swinging movement to move said carriages to said retracted positions, power means for rotating said standard in predetermined increments, work gripping means carried by each of said carriages, actuating means for swinging said actuator arms to move said carriages between said extended and retracted positions, a first support carried by each of said carriages and extending downward therefrom, said work gripping means being attached to said first supports, a first slide bracket member carried on said first support, first power means carried by said first support for moving said bracket vertically along said first support, a second elongated support carried by said slide braket member and positioned so that its longitudinal axis extends horizontally therefrom, said second support having an outer end, said work gripping means being attached to said outer end of said second support, second power means carried by said bracket for rotating said second support about its longitudinal axis, said actuating means including biasing means for normally biasing said actuator arms downward to move said carriages to said extending positions, and sleeve means movably positioned on said standard for upward movement relative thereto to move said actuator arms downward for moving said carriages to said retracted positions.

4. The device of claim 3 and further including cooperating cam and cam follower means for shifting said sleeve means vertically relative to said support.

References Cited

UNITED STATES PATENTS

| | | | |
|---|---|---|---|
| 3,034,822 | 5/1962 | Eldred | 214—1 BC |
| 3,175,702 | 3/1965 | Banyas | 214—1 BC |
| 3,124,065 | 3/1964 | Bozek | 198—210 X |
| 3,252,559 | 5/1966 | Vongal | 214—1 B3 X |
| 3,451,224 | 6/1969 | Colechia | 214—1 RCM |
| 3,007,097 | 10/1961 | Shelley | 214—1 B3 X |
| 3,051,328 | 8/1962 | Brown | 214—1 B3 |
| 3,095,982 | 7/1963 | Weiser | 214—1 B3 |
| 3,386,558 | 6/1968 | Benatar | 214—1 BS4 X |
| 3,586,175 | 6/1971 | Gauld | 214—1 BD |

GERALD M. FORLENZA, Primary Examiner

G. F. ABRAHAM, Assistant Examiner

U.S. Cl. X.R.

198—210